(12) United States Patent
Parker et al.

(10) Patent No.: US 11,498,780 B2
(45) Date of Patent: Nov. 15, 2022

(54) GLASS PRODUCT TRANSPORT APPARATUS AND METHOD OF USE

(71) Applicant: Robex, LLC, Perrysburg, OH (US)

(72) Inventors: Jonathan D. Parker, Perrysburg, OH (US); Aaron J. Peper, Bowling Green, OH (US)

(73) Assignee: Robex, LLC, Perrysburg, OH (US)

( * ) Notice: Subject to any disclaimer, the term of this patent is extended or adjusted under 35 U.S.C. 154(b) by 327 days.

(21) Appl. No.: 16/811,022

(22) Filed: Mar. 6, 2020

(65) Prior Publication Data

US 2020/0283243 A1 Sep. 10, 2020

Related U.S. Application Data

(60) Provisional application No. 62/815,623, filed on Mar. 8, 2019.

(51) Int. Cl.
*B65G 17/34* (2006.01)
*B66C 1/10* (2006.01)
*B65G 49/05* (2006.01)
*B65G 47/90* (2006.01)

(52) U.S. Cl.
CPC ........... *B65G 49/05* (2013.01); *B65G 47/901* (2013.01); *B65G 47/907* (2013.01); *B65G 2201/0247* (2013.01); *B65G 2207/30* (2013.01); *B65G 2207/40* (2013.01)

(58) Field of Classification Search
CPC ........ B65G 49/05; B65G 17/34; B65G 47/90; B66C 1/10

USPC ......... 198/468.2, 468.3, 474.1, 803.2, 803.9, 198/803.15; 294/87.26, 114, 194, 197, 294/198, 207

See application file for complete search history.

(56) References Cited

U.S. PATENT DOCUMENTS

| | | | | |
|---|---|---|---|---|
| 782,305 A | * | 11/1904 | Wolfensberger | |
| 2,337,243 A | * | 12/1943 | Hutaff, Jr. | B65D 71/50 206/145 |
| 2,407,529 A | * | 9/1946 | Bertram | B65D 71/406 294/87.26 |
| 2,454,178 A | * | 11/1948 | Howell | B65D 71/50 294/87.26 |
| 4,206,941 A | * | 6/1980 | Wild | B65B 21/18 294/87.26 |
| 4,684,012 A | * | 8/1987 | Feddersen | B29C 49/4215 294/99.1 |
| 4,754,598 A | * | 7/1988 | Wild | B65B 21/18 53/247 |
| 4,801,001 A | * | 1/1989 | Gibbemeyer | B29C 49/4205 198/482.1 |

(Continued)

*Primary Examiner* — Douglas A Hess
(74) *Attorney, Agent, or Firm* — C. Fred Charpie, III; Ward Law Office LLC

(57) ABSTRACT

A glass product transport apparatus is provided. The glass product transport apparatus includes a slotted element assembly configured to engage a narrowed portion of a glass product. A carriage assembly has a longitudinal slot configured to receive the slotted element assembly for longitudinal movement. An actuator is connected to the slotted element assembly and configured to move the slotted element assembly in a longitudinal direction. A rail structure is configured to support the carriage assembly. The slotted element assembly is configured to retain the glass product in the event power is removed from the actuator.

7 Claims, 15 Drawing Sheets

(56) References Cited

U.S. PATENT DOCUMENTS

| | | | | |
|---|---|---|---|---|
| 5,353,908 | A * | 10/1994 | Wihlidal | B08B 9/426 |
| | | | | 198/339.1 |
| 5,513,888 | A * | 5/1996 | Kirkland | B65D 71/50 |
| | | | | 294/159 |
| 5,706,958 | A * | 1/1998 | Spamer | A47F 1/12 |
| | | | | 211/74 |
| 7,287,792 | B2 * | 10/2007 | Tye | B67C 3/242 |
| | | | | 294/99.1 |
| 9,545,725 | B2 * | 1/2017 | Yohe | B25J 15/0226 |
| 9,878,483 | B2 * | 1/2018 | Leroux | B65G 47/847 |
| 10,550,035 | B2 * | 2/2020 | Dannoux | B65G 49/045 |

* cited by examiner

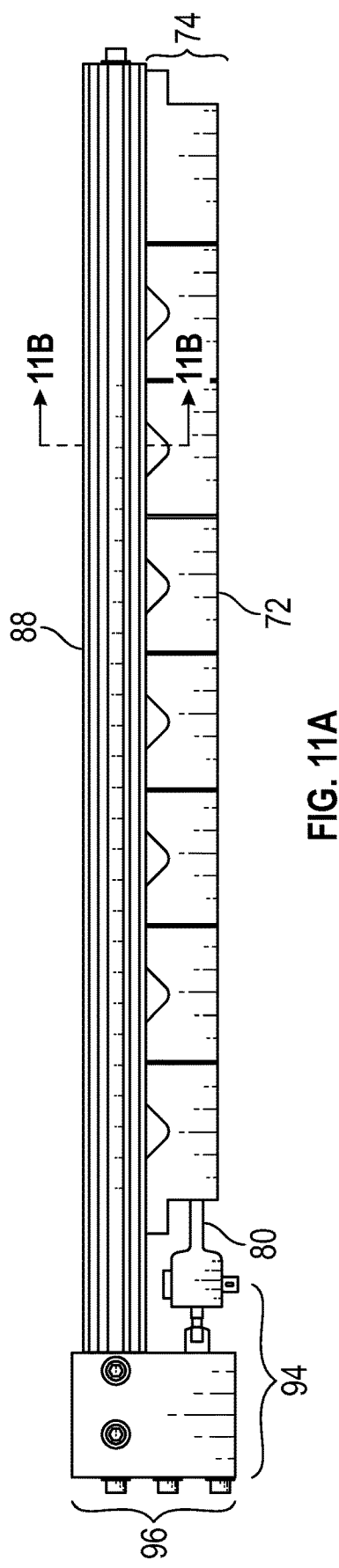
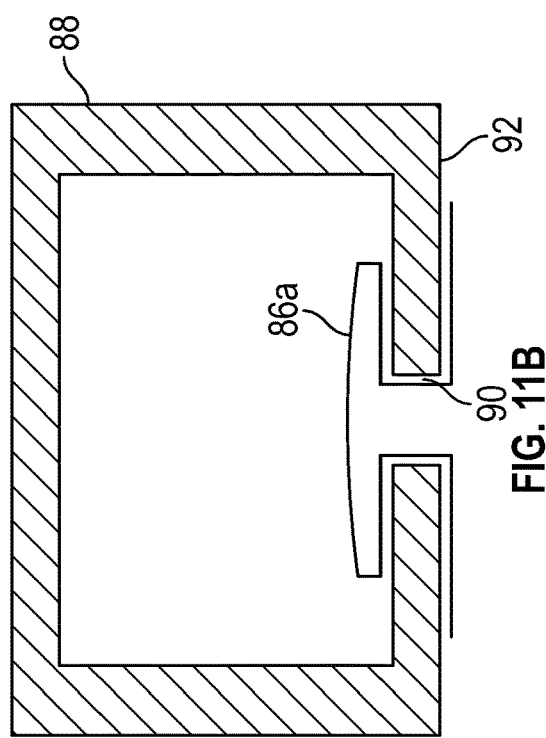
FIG. 11A
FIG. 11B

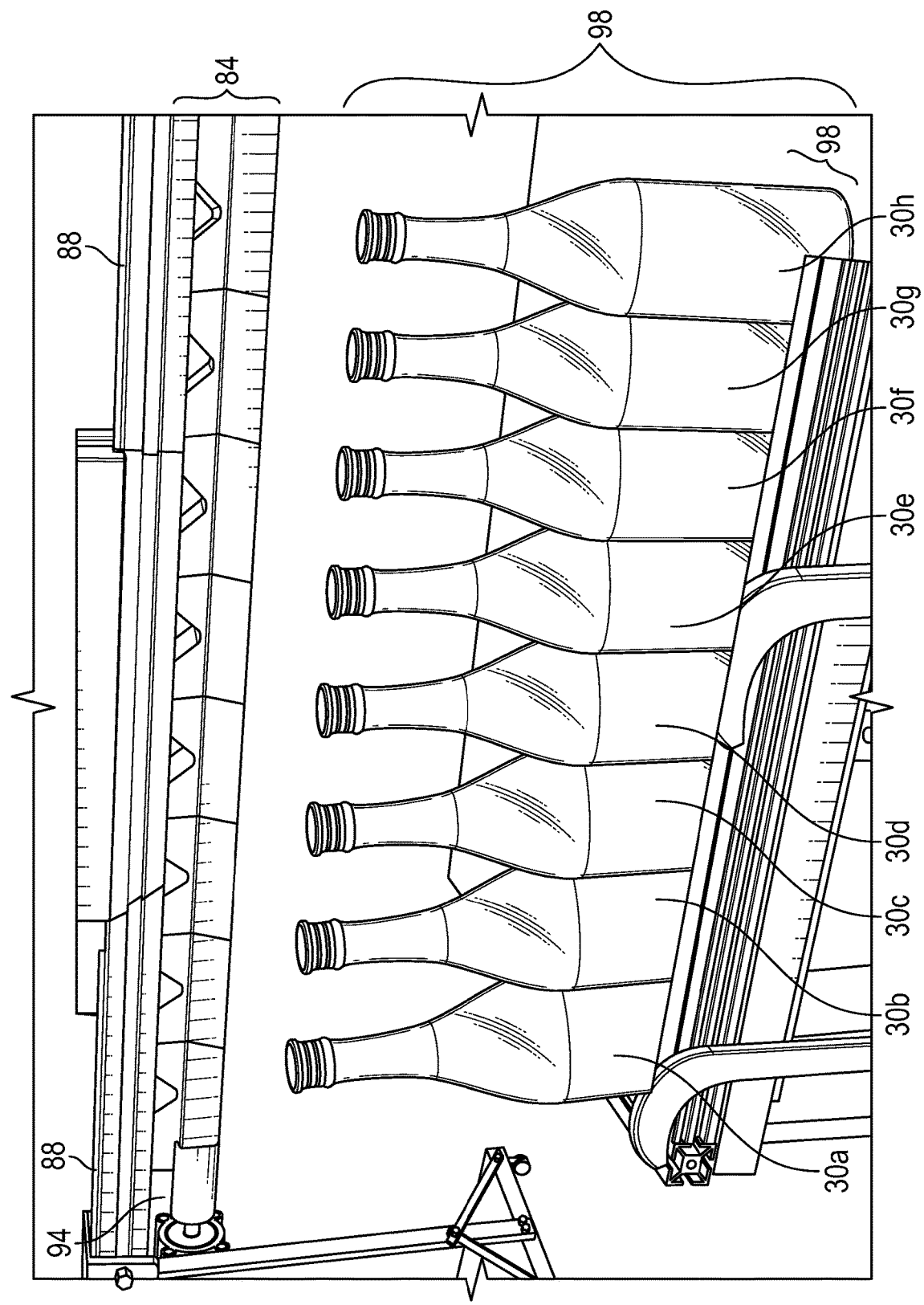

GLASS PRODUCT TRANSPORT APPARATUS AND METHOD OF USE

RELATED APPLICATIONS

This application claims the benefit of U.S. Provisional Patent Application No. 62/815,623, filed Mar. 8, 2019, the disclosure of which is incorporated herein by reference in its entirety.

BACKGROUND

In the production of glass products, such as the non-limiting example of glass bottles, it can be desirable to move a quantity of glass products from one location to another location. One non-limiting example of a desirable movement of a quantity of glass products in production is to palletize or depalletize the quantity of glass products.

Conventional machines for moving a quantity of glass products are known to grip and secure the neck and/or collar of each glass product with gripping apparatus. Conventional gripping apparatus typically use actuating mechanisms actuated with pneumatic, hydraulic, electric structures or combinations thereof to grip and secure the glass products.

In certain instances, a loss of electrical power to the conventional gripping apparatus can result in a loss of gripping force, thereby resulting in the gripped glass products falling away from the gripping apparatus and possible breakage of the glass products.

It would be advantageous if apparatus for gripping and transporting glass products could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the glass product transport apparatus and method of use.

The above objects as well as other objects not specifically enumerated are achieved by a glass product transport apparatus. The glass product transport apparatus includes a slotted element assembly configured to engage a narrowed portion of a glass product. A carriage assembly has a longitudinal slot configured to receive the slotted element assembly for longitudinal movement. An actuator is connected to the slotted element assembly and configured to move the slotted element assembly in a longitudinal direction. A rail structure is configured to support the carriage assembly. The slotted element assembly is configured to retain the glass product in the event power is removed from the actuator.

The above objects as well as other objects not specifically enumerated are also achieved by a method of using a glass product transport apparatus. The method includes the steps of engaging a narrowed portion of a glass product with a slotted element assembly, receiving the slotted element assembly within a longitudinal slot of a carriage assembly, the longitudinal slot configured to facilitate longitudinal movement of the slotted element assembly, moving the slotted element assembly in a longitudinal direction with an actuator and supporting the carriage assembly with a rail structure. The slotted element assembly is configured to retain the glass product in the event power is removed from the actuator.

Various objects and advantages of the glass product transport apparatus and method of use will become apparent to those skilled in the art from the following detailed description, when read in light of the accompanying drawings.

BRIEF DESCRIPTION OF THE DRAWINGS

FIG. 11A is a side perspective view of glass product transport apparatus of FIG. 10.

FIG. 11B is a cross-sectional view of the rail structure of FIG. 10.

FIG. 12 is a side perspective view of the glass product transport apparatus of FIG. 10 positioned to engage a plurality of glass products.

DETAILED DESCRIPTION

The glass product transport apparatus and method of use will now be described with occasional reference to specific embodiments. The glass product transport apparatus and method of use may, however, be embodied in different forms and should not be construed as limited to the embodiments set forth herein. Rather, these embodiments are provided so that this disclosure will be thorough and complete, and will fully convey the scope of the glass product transport apparatus and method of use to those skilled in the art.

Unless otherwise defined, all technical and scientific terms used herein have the same meaning as commonly understood by one of ordinary skill in the art to which the glass product transport apparatus and method of use belongs. The terminology used in the description of the glass product transport apparatus and method of use is for describing particular embodiments only and is not intended to be limiting of the glass product transport apparatus and method of use. As used in the description of the glass product transport apparatus and method of use and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the glass product transport apparatus and method of use. Notwithstanding that the numerical ranges and parameters setting forth the broad scope of the glass product transport apparatus and method of use are approximations, the numerical values set forth in the specific examples are reported as precisely as possible. Any numerical values, however, inherently contain certain errors necessarily resulting from error found in their respective measurements.

The description and figures disclose a glass product transport apparatus and method of use. Generally, the glass product transport apparatus is configured to secure a plurality of glass products and facilitate transfer of the plurality of glass products to another location. The apparatus is further configured such that the plurality of glass products remain secured to the apparatus in the event of a loss of power, thereby preventing damage to the plurality of secured glass products.

The term "glass product", as used herein, is defined to mean any structure or container used to store liquids or other materials. Glass products can have different forms such as the non-limiting examples of containers, bottles, jars and the like.

Figure 1:
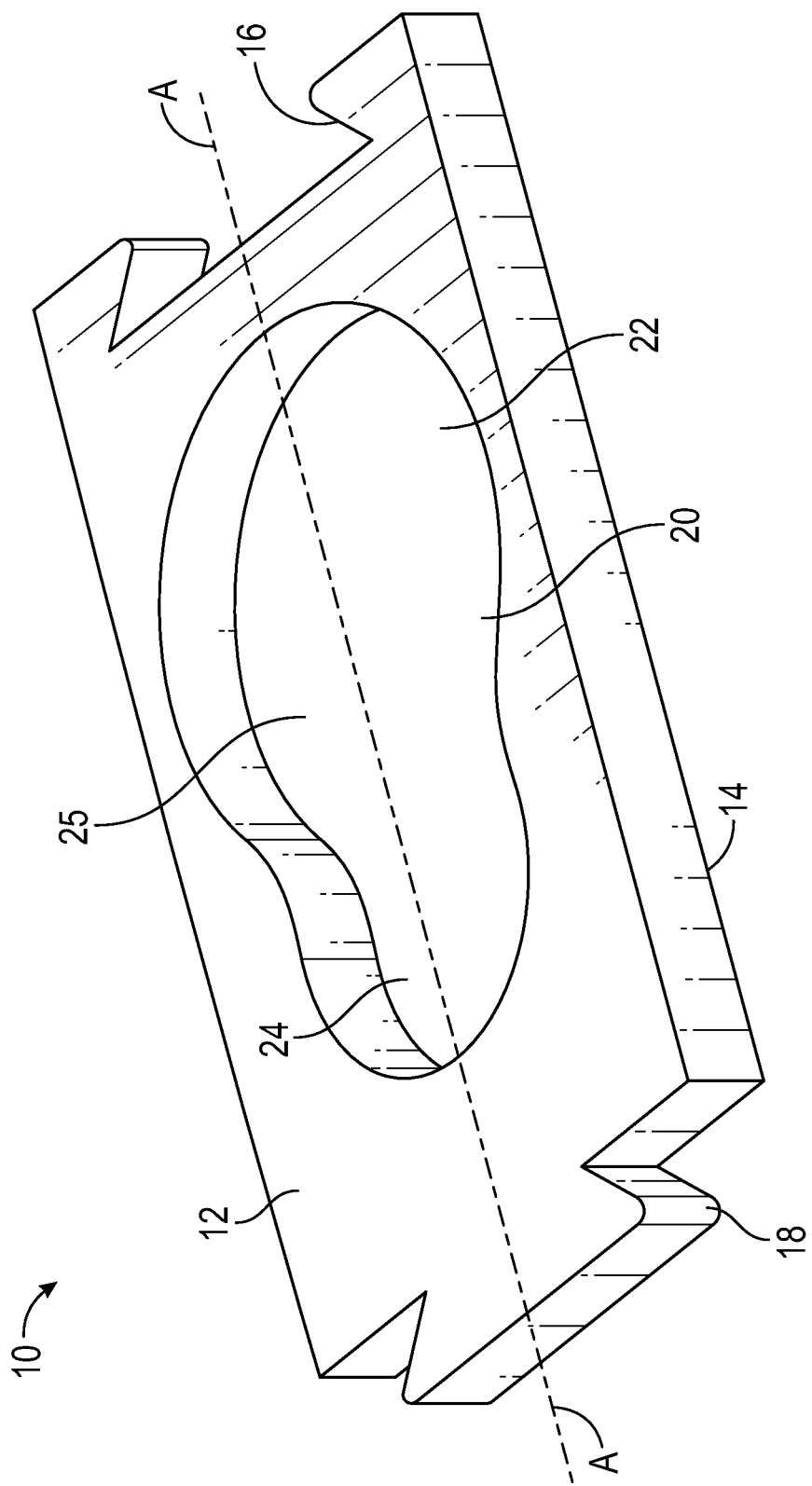
FIG. 1 is a perspective view of a slotted element in accordance with a glass product transport apparatus.

Referring now to FIG. 1, a slotted element is illustrated generally at 10. The slotted element 10 includes a first major side 12, a second major side 14, a female dovetail segment 16, a male dovetail segment 18 and a slot 20. The slot 20 includes a first aperture 22 and a second aperture 24. The first and second apertures 22, 24 each have a rounded cross-sectional shape with a diameter of the first aperture 22 being larger than a diameter of the second aperture 24. The first aperture 22 and the second aperture 24 are connected in a manner such as to form a key-hole type of opening 25. The female dovetail segment 16, male dovetail segment 18, first aperture 22 and the second aperture 24 are centered along longitudinal element axis A-A.

Figure 2:
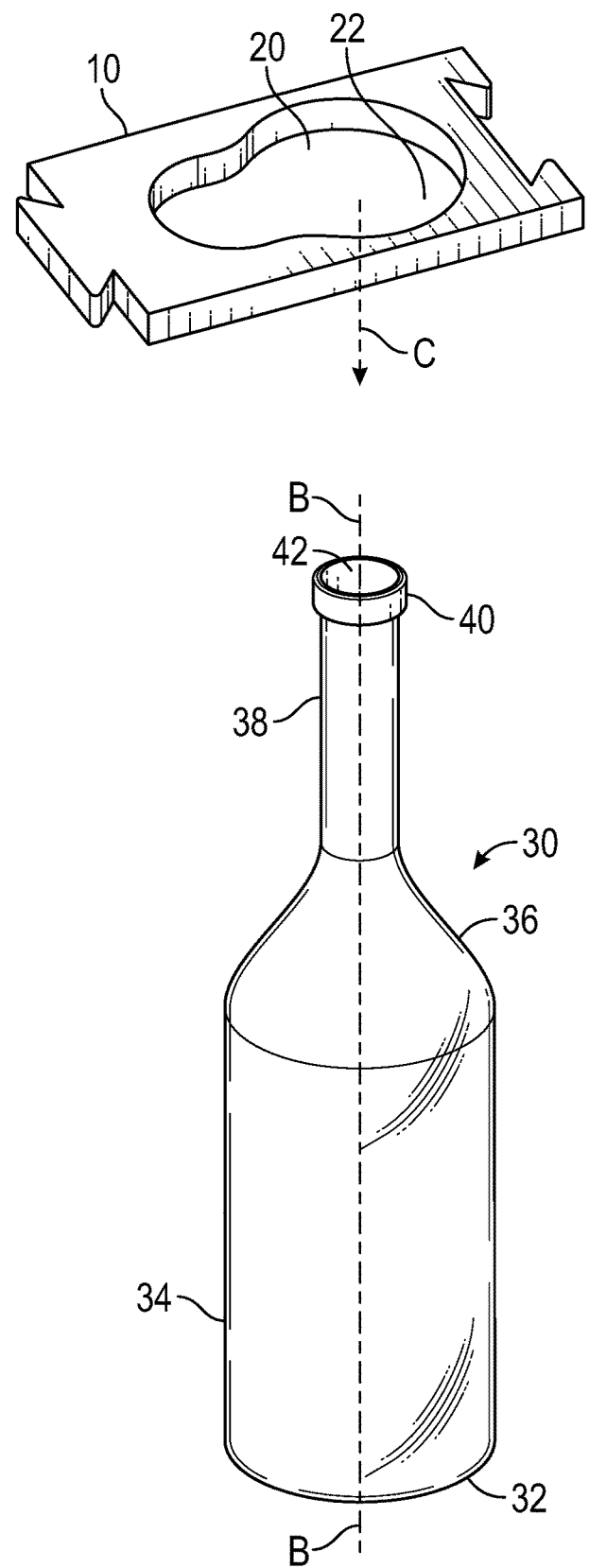
FIG. 2 is a perspective view of the slotted element of FIG. 1, positioned to engage a conventional glass product.
Figure 3:
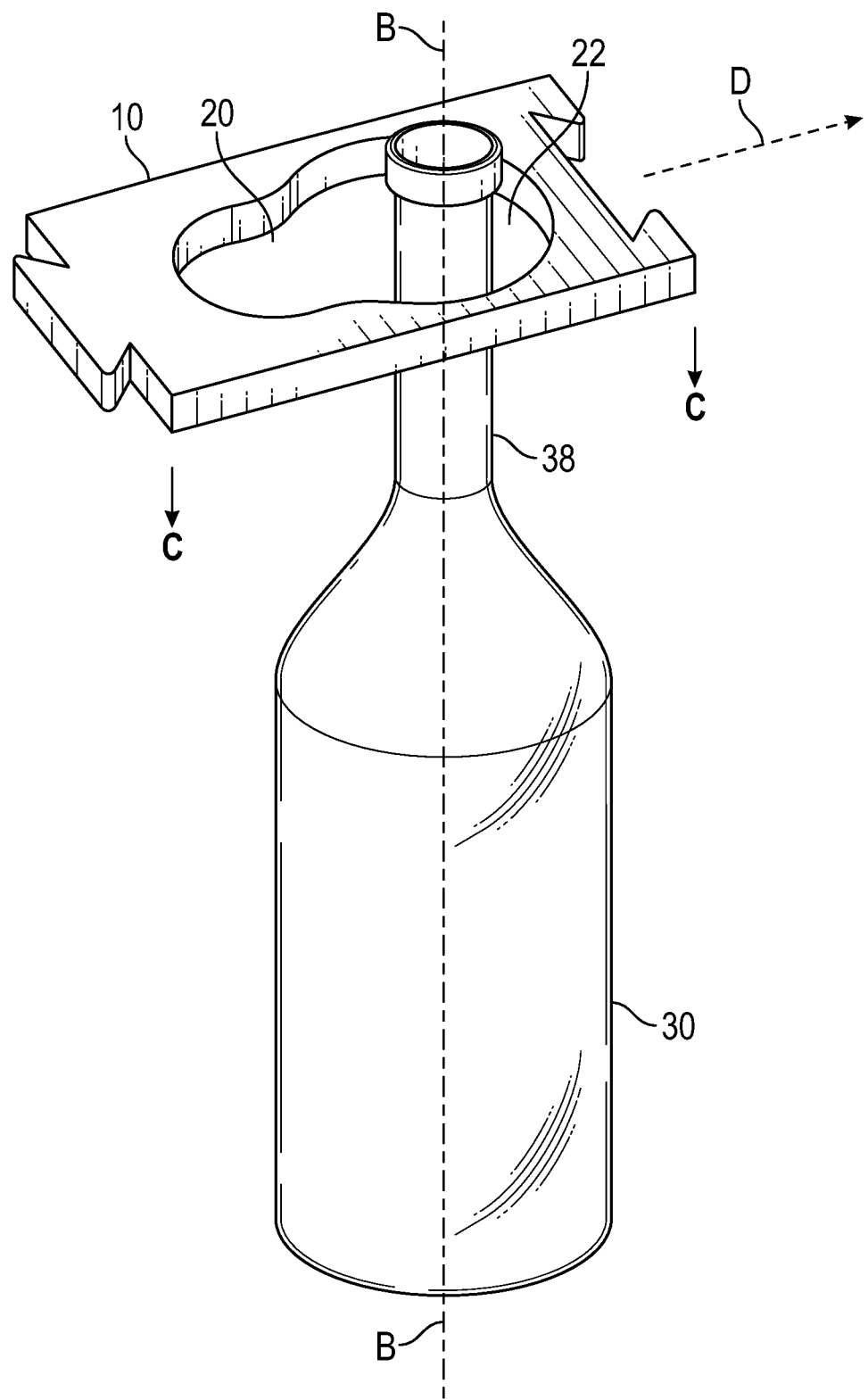
FIG. 3 is a perspective view of the slotted element of FIG. 1, shown engaging a conventional glass product.
Figure 4:
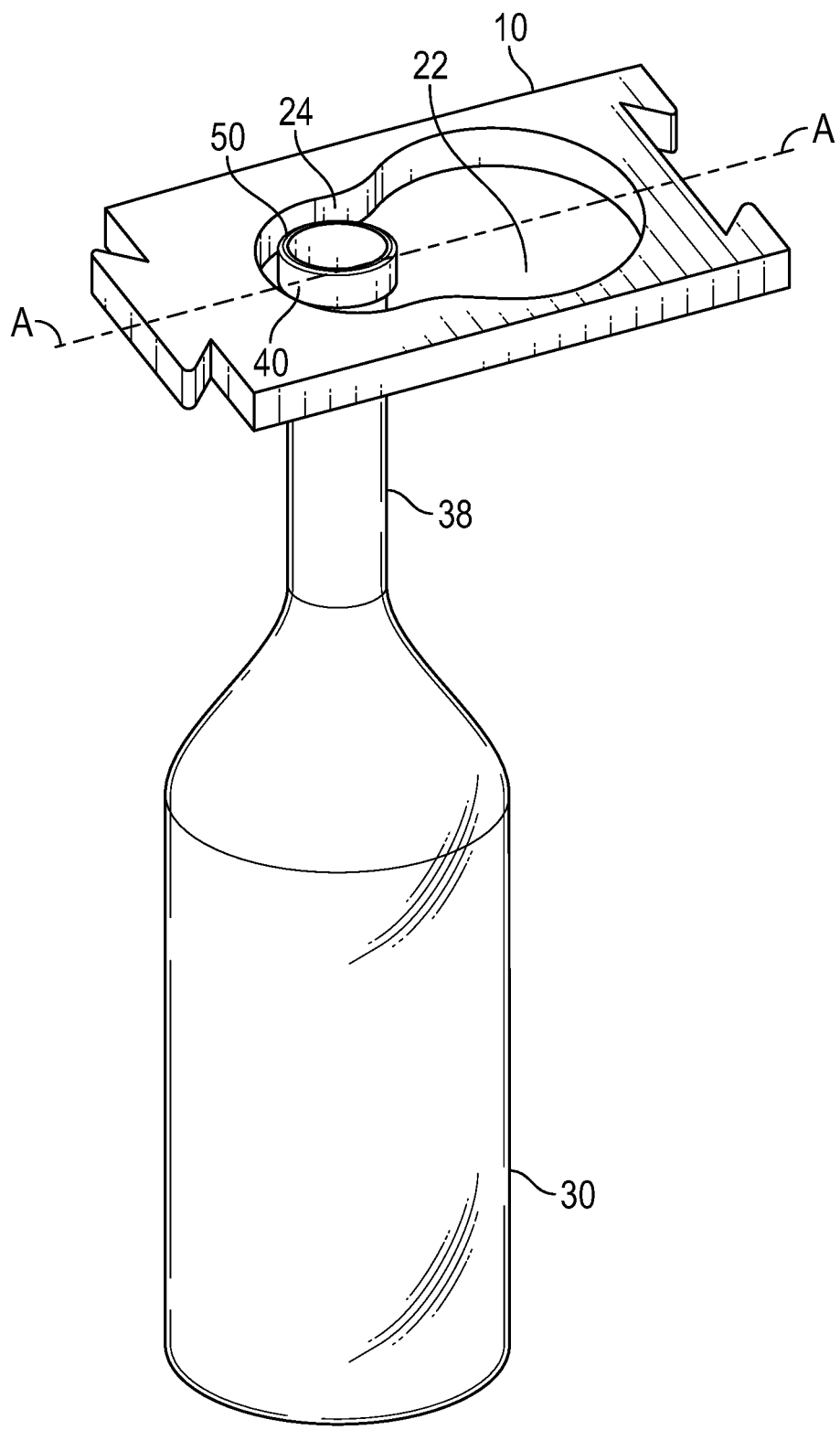
FIG. 4 is a perspective view of the slotted element of FIG. 1, engaging and securing a conventional glass product.

Referring now to FIGS. 2-4, the slotted element 10 is configured to secure a glass product for transport to another location. Referring first to FIG. 2, a glass product, such as the non-limiting example of a bottle, is illustrated generally at 30. The glass product is conventional in the art and will only be briefly described herein. The glass products 30 includes a base portion 32, a body portion 34, a shoulder portion 36, a neck portion 38, a collar portion 40 and a mouth 42. The glass products 30 is axially aligned along a longitudinal product axis B-B.

Referring again to FIG. 2, in a first step to securing the glass product 10, the first aperture 22 of the slot 20 of the slotted element 10 is centered about the longitudinal product axis B-B of the glass product 30.

Referring now to FIG. 3, the first aperture portion 22 of the slot 20 is centered about longitudinal product axis B-B of the glass product 10. The slotted element 10 is lowered, as shown by direction arrows C, in a manner such that the first aperture 22 of the slot 20 remains centered about of the slotted element 10. The slotted element 10 continues to be lowered in a manner such the neck portion 38 of the glass product 30 extends through the first aperture 22 of the slot 20 of the slotted element 10.

Referring now to FIGS. 3 and 4 in a next step, with the neck portion 38 of the glass product still extending through the first aperture 22 of the slot 20, the slotted element 10 is moved along longitudinal element axis A-A, as indicated by direction arrow D, toward the second aperture 24 of the keyhole slot 20. The movement of the slotted element 10 in direction D continues until the neck portion 38 seats against an inner edge 50 of the second aperture 24 of the slot 20. Since the diameter of the second aperture 24 of the slot 20 is slightly larger than the diameter of the neck portion 38 of the glass product 30 and slightly smaller than the diameter of the collar portion 40 of the glass product 30, the glass product 30 is now secured in the second aperture 24 of the slot 20. In this position, the glass product 30 and can have limited movement in both vertical and horizontal directions, while being constrained by the larger diameters of the shoulder and portions 36, 40.

Figure 5:
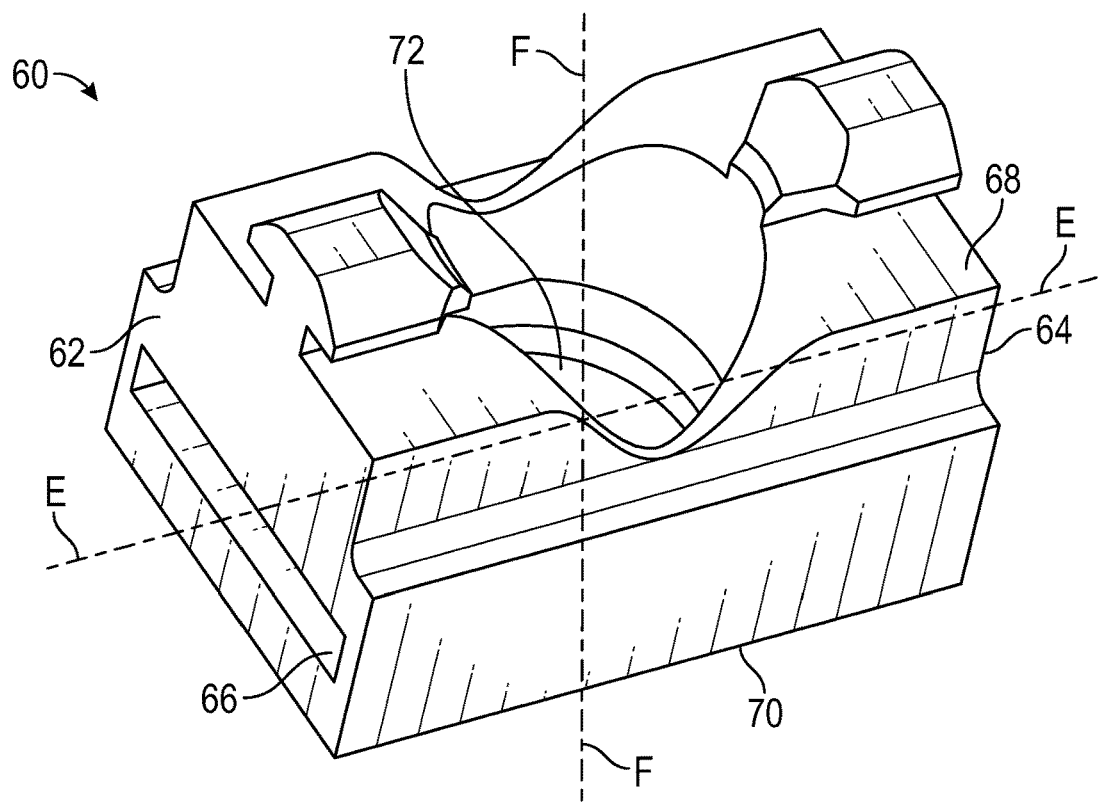
FIG. 5 is a top perspective view of a support carriage.
Figure 6:
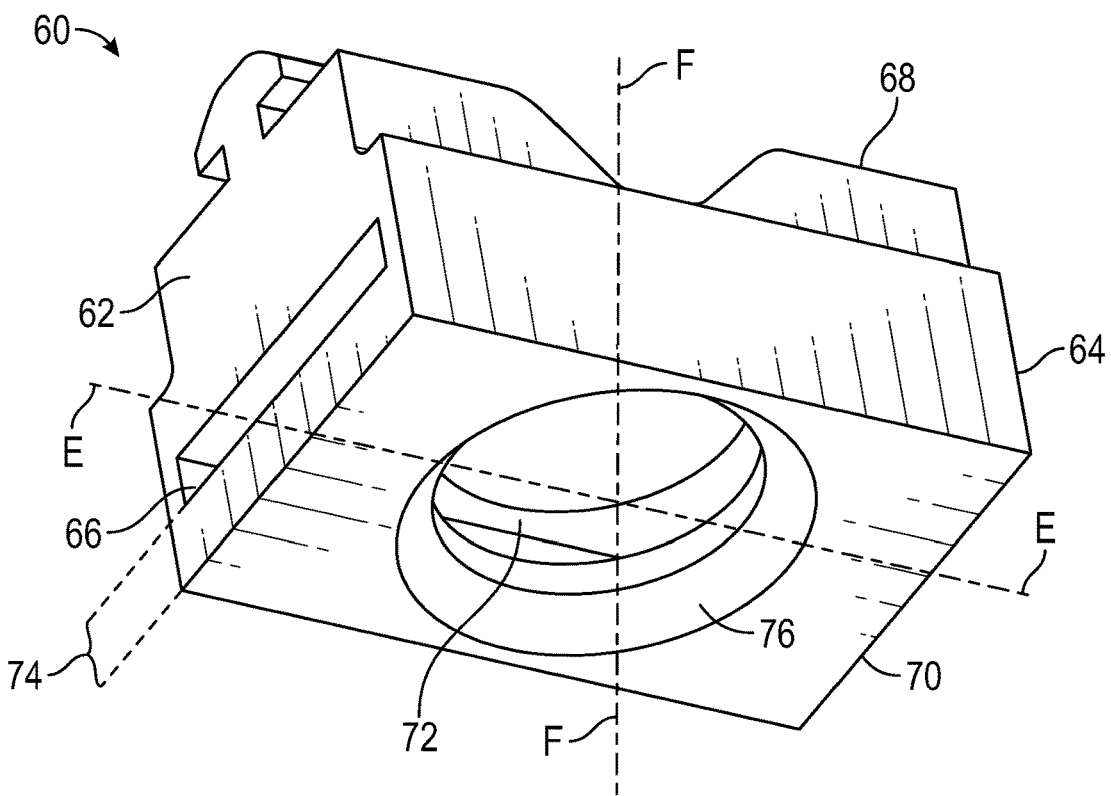
FIG. 6 is a bottom perspective view of the support carriage of FIG. 5.

Referring now to FIGS. 5 and 6, a support carriage 60 is illustrated. The support carriage 60 is radially aligned along longitudinal axis E-E and includes a first end 62, a second end 64 and a slot 66 extending therebetween. The support carriage 60 also includes a top face 68 and an opposing bottom face 70. The slot 66 is configured to slidably receive the slotted element 10 in a manner such that the slotted element 10 can move in the direction of longitudinal carriage axis E-E.

Referring again to FIGS. 5 and 6, the support carriage 60 includes a carriage aperture 72 that extends from the top face 68 to the bottom face 70. The carriage aperture 72 is centered about aperture axis F-F. The axis carriage E-E has a substantially perpendicular arrangement with the aperture axis F-F.

Referring now to FIG. 6, a lower portion 74 of the carriage aperture 72 has a beveled circumferential edge 76. The beveled circumferential edge 76 advantageously provides a guide for the neck 38 of the glass product 30 as the slotted element 10 is lowered in a manner such the neck portion 38 of the glass product 30 extends through the first aperture 22 of the slot 20 of the slotted element 10.

Figure 7:
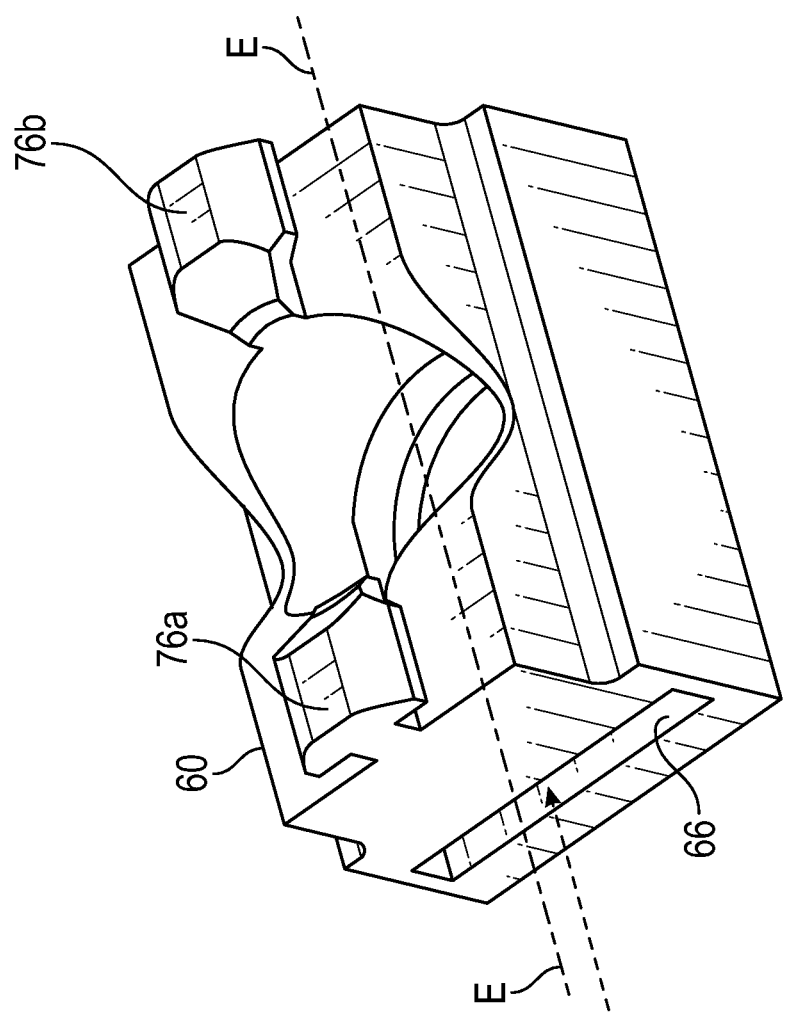
FIG. 7 is a perspective view of the support carriage of FIG. 5 receiving the slotted element of FIG. 1.

Referring now to FIG. 7 and as described above, the slot 66 of the support carriage 60 is configured to slidably receive the slotted element 10 in a manner such that slot 66 guides the slotted element 10 as the support carriage 60 moves within the slot 66 in the direction of longitudinal axis E-E.

Figure 8:
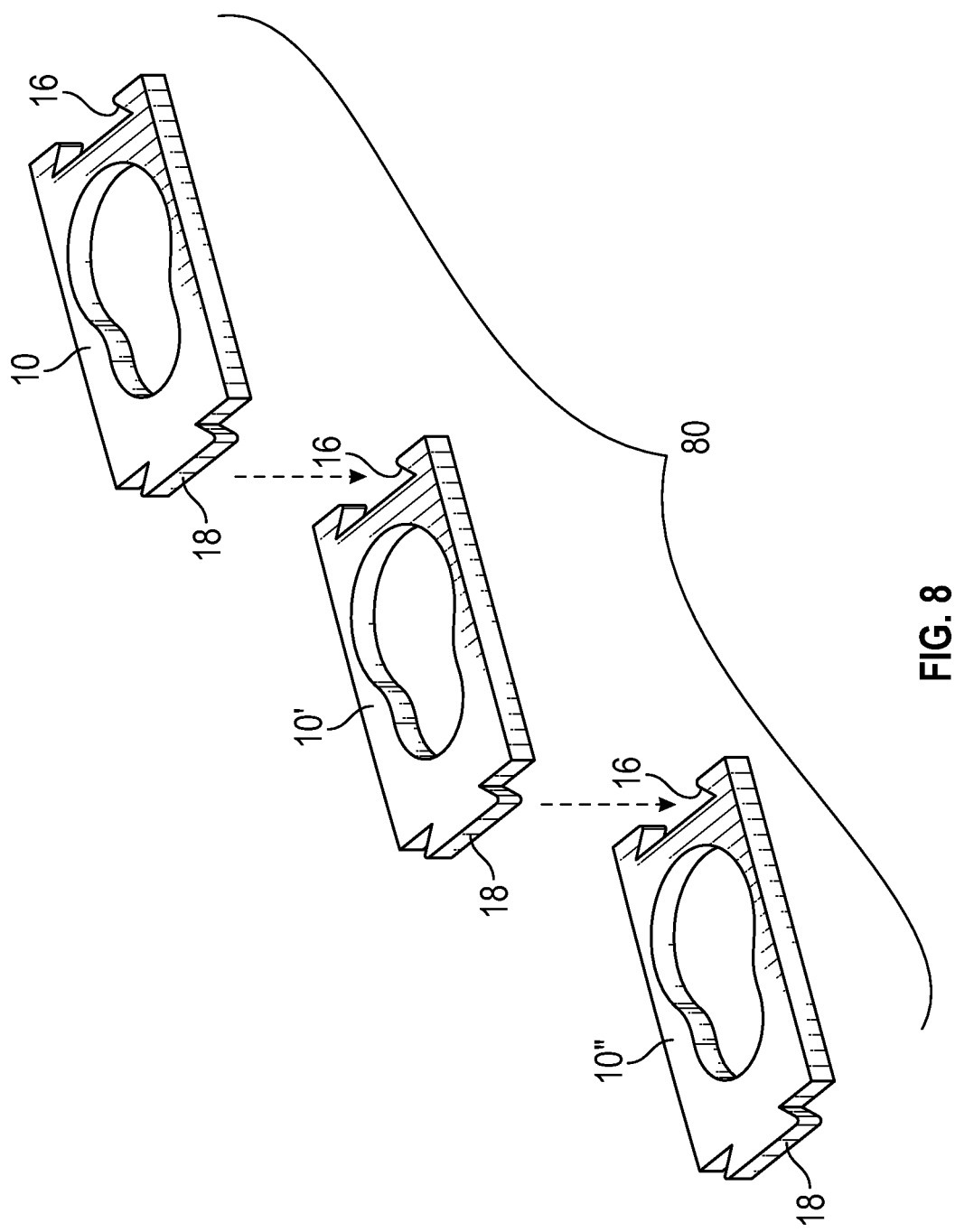
FIG. 8 is a perspective view of a plurality of slotted elements of FIG. 1 assembled together to form a slotted element assembly.
Figure 9:
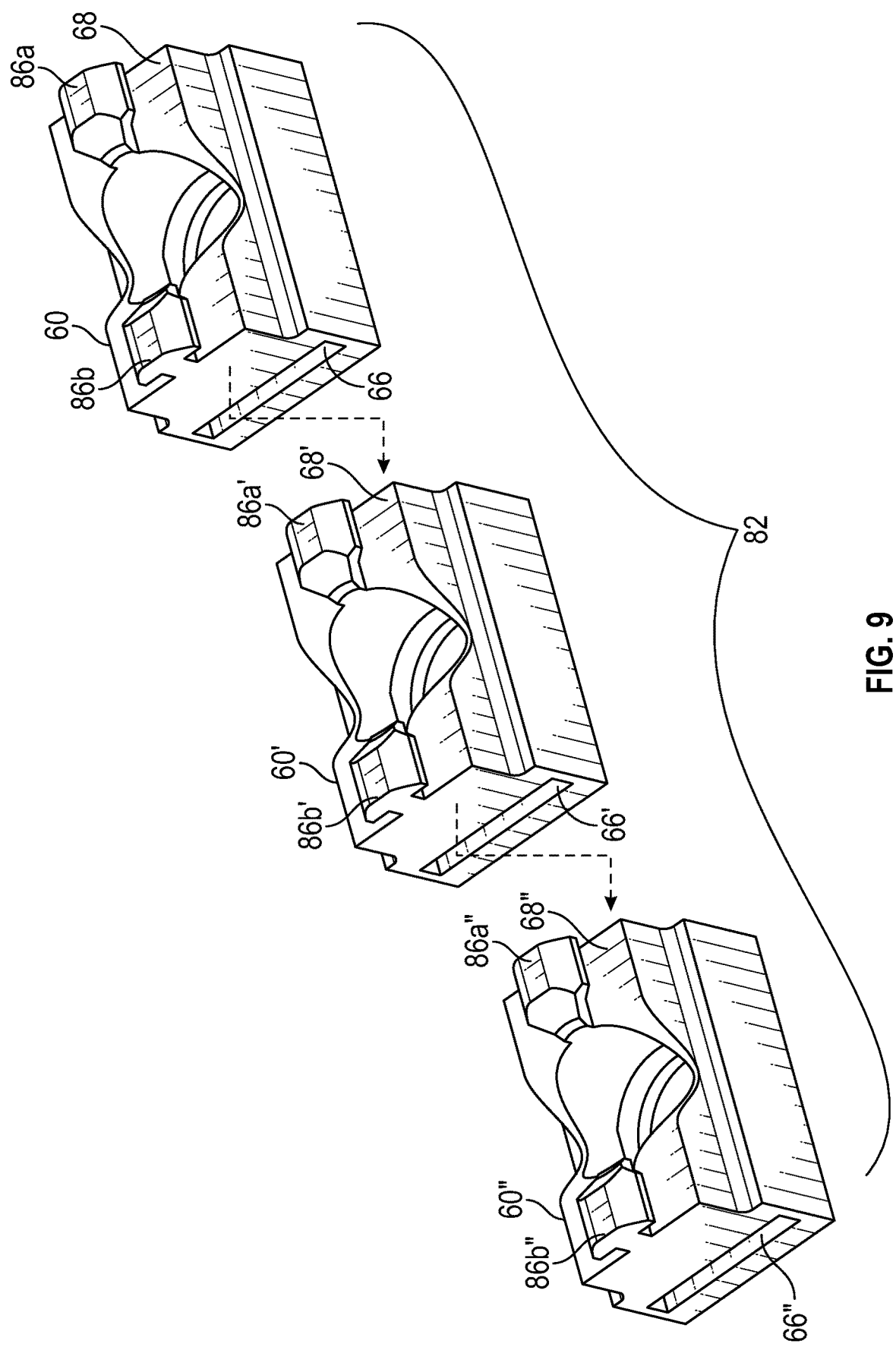
FIG. 9 is a perspective view of a plurality of support carriages of FIG. 5 assembled together to form a carriage assembly.

Referring now to FIGS. 8 and 9, it should be appreciated that a plurality of slotted elements 10, 10', 10" can be fitted together in an end-to-end manner to facilitate the securing and transfer of a plurality of glass products to another location. In the illustrated embodiment, the slotted elements 10, 10', 10" are fitted together in an end-to-end manner as a male dovetail segment 18 of a first slotted element 10 is inserted into a female dovetail segment 16 of a second slotted element 10' and a male dovetail segment 18 of the second slotted element 10' is inserted into a female dovetail segment 16 of a third slotted element 10". Any desired quantity of slotted elements can be connected together in this manner. The first, second and third slotted elements 10, 10' and 10" form a slotted element assembly 80.

Referring now to FIG. 9, a carriage assembly 82 can be formed to support the slotted element assembly 80. The carriage assembly 82 is formed from joining together a plurality of support carriages 60, 60' and 60" in an end-to-end manner. The support carriages 60, 60' and 60" are joined together such that the respective slots 66, 66' and 66" axially align with each other in a manner such that the slotted element assembly 80 can extend through the aligned slots 66, 66' and 66".

Figure 10:
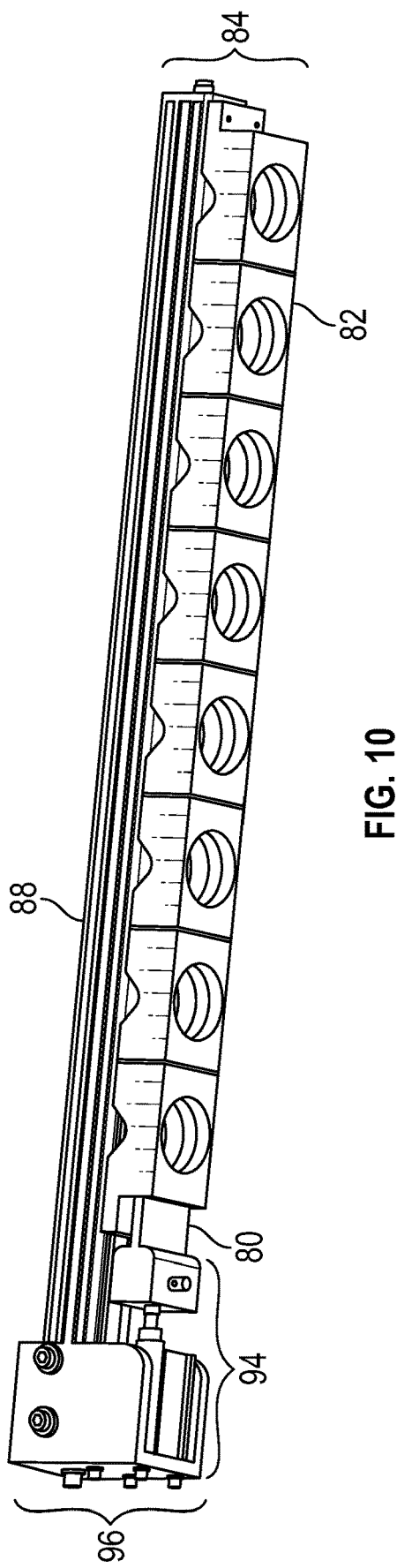
FIG. 10 is a perspective view of the slotted element assembly of FIG. 8 and the carriage assembly of FIG. 9 assembled together to form a transport assembly.

Referring now to FIGS. 10 and 11A, the slotted element assembly 80 and the carriage assembly 82 are illustrated in an assembled orientation. The slotted element assembly 80 has been inserted into the aligned slots (not shown for purposes of clarity) of the carriage assembly 82 in an axially slidable arrangement. The combination of the slotted element assembly 80 and the carriage assembly 82 forms a transport assembly 84.

Referring again to FIG. 9, each of the support carriages 60, 60', 60" includes a plurality of tabs 86a, 86b, 86a', 86b', 86a", 86b" that extend from the top faces 68, 68', 68". Each of the tabs 86a, 86b, 86a', 86b', 86a", 86b" has a T-shaped cross-sectional shape and is configured for insertion into a mating structure that allows the support carriages 60, 60', 60" to hang in a suspended arrangement. While the embodiment shown in FIG. 9 provides a quantity of two tabs for each support carriages 60, 60', 60", in other embodiments, each of the support carriages 60, 60', 60" can have more or less than two tabs.

Referring now to FIGS. 10 and 11A, and as discussed above the tabs 86a, 86b, 86a', 86b', 86a", 86b" are configured for engagement with a mating rail structure 88, in a manner such that the length of the slotted element assembly 80 is structurally supported as the slotted element assembly 80 grips and transports a quantity of glass products. Referring now to the embodiment illustrated in FIG. 11B, the T-shaped of the tabs 86a, 86b, 86a', 86b', 86a", 86b" is shown in an engaged arrangement with the mating rail structure 88. In the illustrated embodiment, the rail structure 88 has the form of a four-sided channel with a slot 90 extending along a bottom side 92. H86a, 86b, 86a', 86b', 86a", 86b" and the rail structure 88 can have other forms and can be other structures sufficient to structurally support the slotted element assembly 80 as the slotted element assembly 80 grips and transports a quantity of glass products.

Referring again to FIGS. 10 and 11, an actuator 94 connects to the slotted element assembly 80 and is configured to cause axial movement of the slotted element assembly 80 within the aligned slots 62, 62' and 62" of the carriage assembly 82. In the illustrated embodiment, the actuator 94 is a pneumatic device. However, in other embodiments the actuator 94 can be other mechanisms, structures and/or devices sufficient to cause axial movement of the slotted element assembly 80 within the aligned slots 62, 62' and 62" of the carriage assembly 82. The combination of the transport assembly 84, rail structure 88 and the actuator 94 forms a glass product transport apparatus 96.

Referring now to FIG. 12, the glass product transport apparatus 96 is illustrated in a first orientation. The glass product transport apparatus 96 includes the transport assembly 84, rail structure 88 and the actuator 94. A plurality of glass products 30a-30h are illustrated and arranged in a column 98. In the embodiment illustrated in FIG. 12, the first apertures 22 of the slotted elements 10 are centered about the longitudinal axis B-B of the glass products 30 as shown in FIG. 2 and described above. The glass product transport apparatus 96 has not been lowered. Accordingly, the neck portion 38 of the glass products 30 has not been engaged by the first aperture 22 of the slotted element 10.

Figure 13:
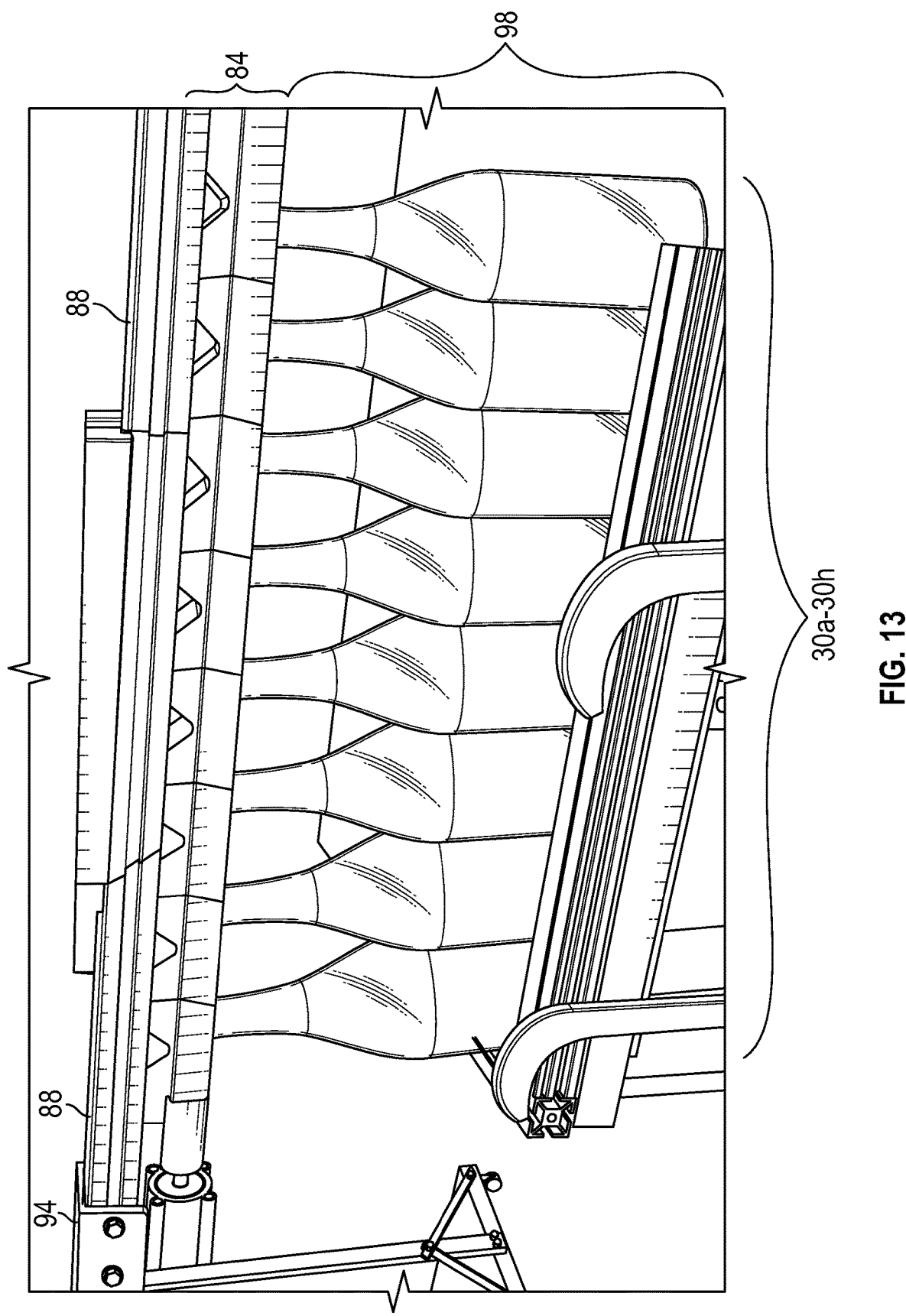
FIG. 13 is a side perspective view of the glass product transport apparatus of FIG. 10 engaging a plurality of glass products in a manner such as to be ready for transport.

Referring now to FIG. 13, the glass product transport apparatus 96 is illustrated in a second orientation. In the second orientation, the plurality of glass products 30a-30h have been engaged by the second apertures 24 of the slots 20 of the slotted elements 10, thereby securing the glass products 30a-30h to the glass product transport apparatus 96. In this orientation, the plurality of glass products 30a-30g are secured for transport. Since the lateral movement of the slotted element assembly 80 within the carriage assembly 82 has captured the plurality of glass products 30a-30g within the second apertures 24 of the slotted elements 10, a loss of power to the actuator 94 does not release the grip of the second apertures 24 on the necks 38 of the glass products 30a-30h. Accordingly and advantageously, the glass product transport apparatus 96 continues to grip and secure the glass products 30a-30h in the event of a loss of power to the actuator 94.

While the embodiment of the glass product transport apparatus 96 shown in FIGS. 12 and 13 illustrates a single column 98 of glass products 30a-30g having a certain size and shape, it should be appreciated that in other embodiments, the glass product transport apparatus can be configured for securing and transporting more than a single column of glass products and glass products having other sizes and shapes.

Figure 14:
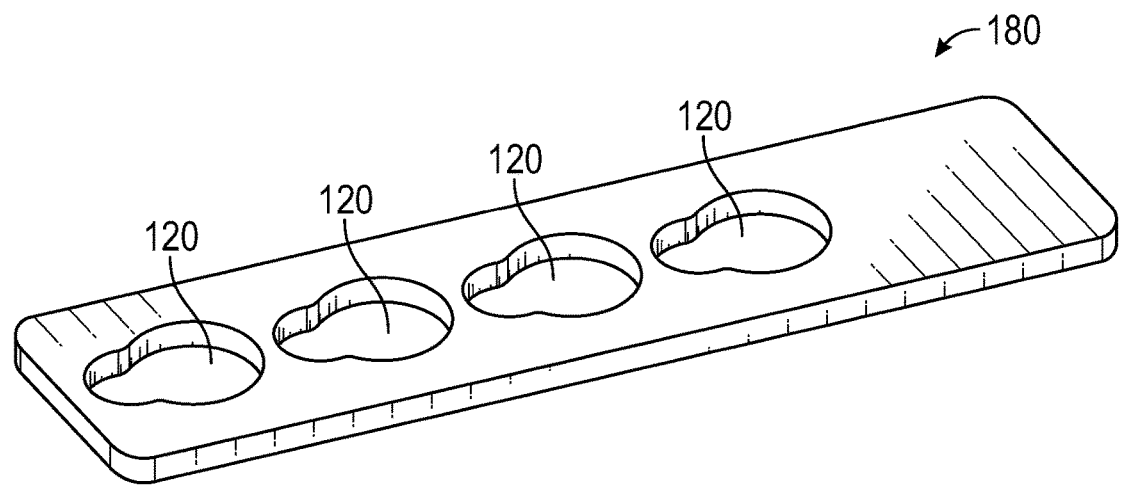
FIG. 14 is a side perspective view of a second embodiment of a slotted element assembly.

Referring again to FIG. 8, the slotted element assembly 80 is described above as being formed from a plurality of slotted elements 10. Advantageously, this facilitates the formation of a slotted element assembly 80 of variable capacity. However, it should be appreciated that the slotted element assembly 80 can be formed in other manners. Referring now to FIG. 14, an alternate slotted element assembly is shown generally at 180. The slotted element assembly 180 is formed as a unitary body having a defined quantity of slots 120. In the embodiment shown in FIG. 14, the slotted element assembly 180 has a quantity of four slots 120. In alternate embodiment, the slotted element assembly 180 can have more or less than four slots 120.

Figure 15:
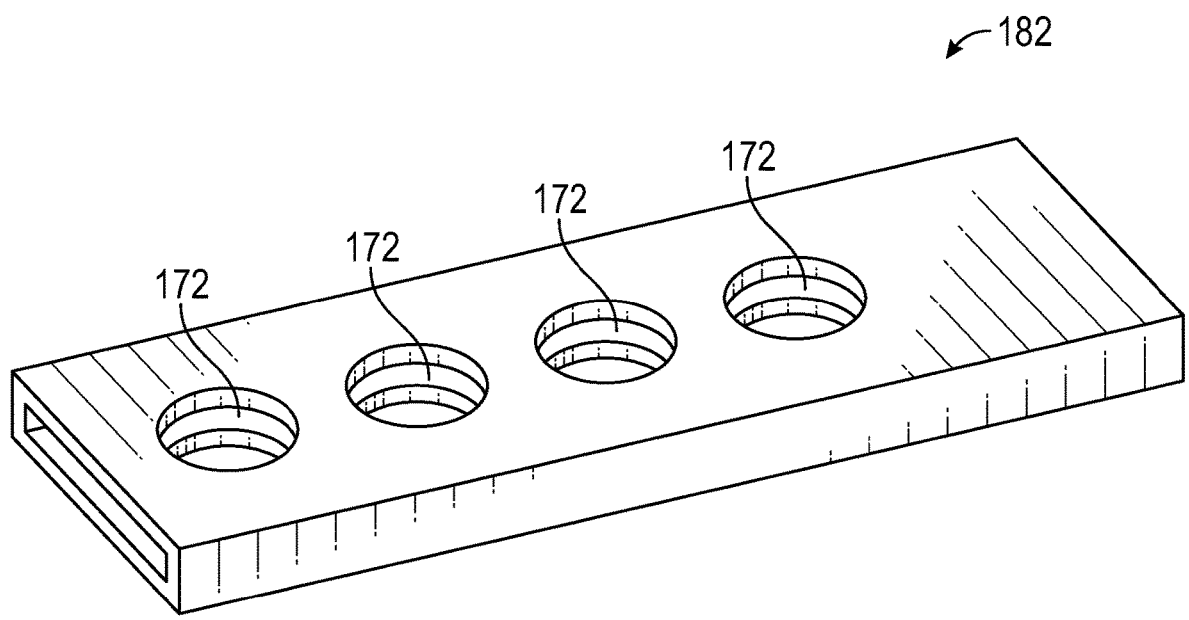
FIG. 15 is a side perspective view of a second embodiment of a carriage assembly.

Referring now to FIG. 9, the carriage assembly 82 is described above as being formed from a plurality of support carriages 60. Advantageously, this facilitates the formation of a carriage assembly 82 of variable capacity. However, it should be appreciated that the carriage assembly 82 can be formed in other manners. Referring now to FIG. 15, an alternate carriage assembly is shown generally at 182. In a manner similar to the slotted element assembly 180, the carriage assembly 182 is formed as a unitary body having a longitudinal slot 166 and a defined quantity of carriage apertures 172. In the embodiment shown in FIG. 14, the carriage assembly 182 has a quantity of four carriage apertures 172. In alternate embodiment, the carriage assembly 182 can have more or less than four carriage apertures 172.

Figure 16:
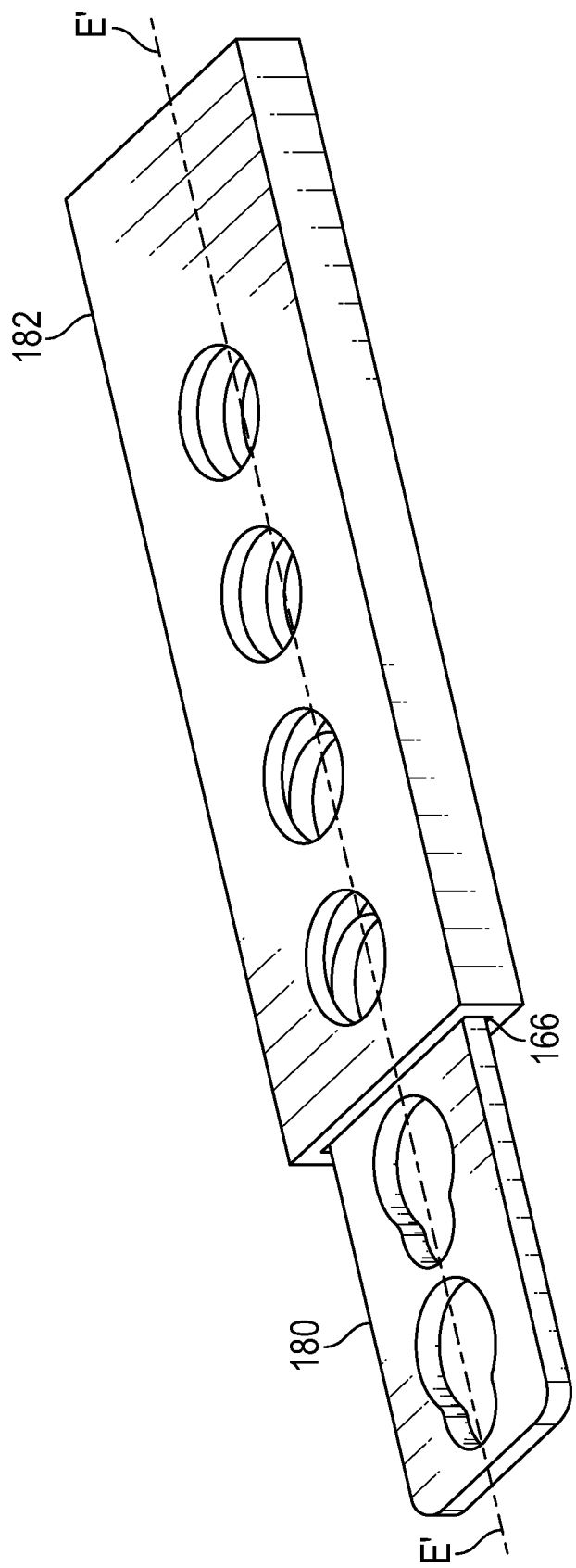
FIG. 16 is a perspective view of the slotted element assembly of FIG. 14 and the carriage assembly of FIG. 15 assembled together to form a transport assembly.

Referring now to FIG. 16, the slot 166 of the carriage assembly 182 is configured to slidably receive the slotted element assembly 180 in a manner such that carriage assembly 182 guides the slotted element assembly 180 as the slotted element assembly 180 moves within the slot 166 in the direction of longitudinal axis E'-E'.

Figure 17:
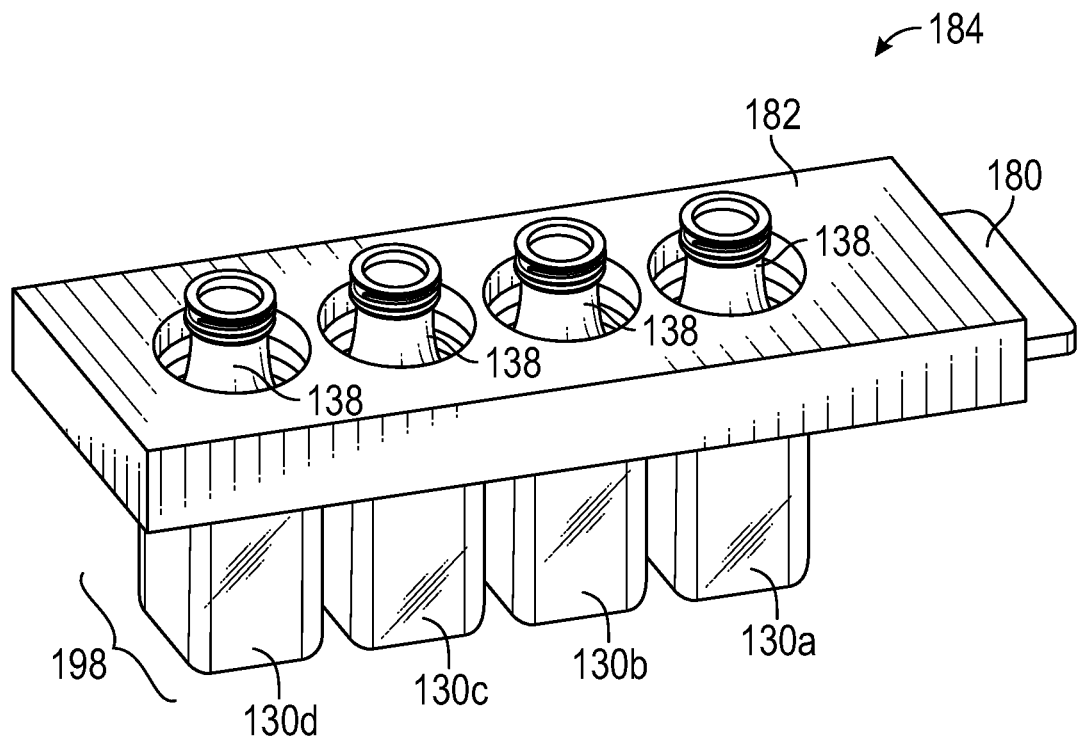
FIG. 17 is a side perspective view of the transport assembly of FIG. 16 engaged with a plurality of glass products.

Referring now to FIG. 17, the slotted element assembly 180 and the carriage assembly 182 are combined to form a transport assembly 184. The transport assembly 184 is illustrated in a first engagement with a plurality of glass products 130*a*-130*d*. The glass products are arranged in a column 198. As shown in FIG. 17, the transport assembly 184 has been lowered such that the neck portions 138 of the glass products 130*a*-130*d* has been engaged by the first apertures of the slotted element assembly 180.

Figure 18:
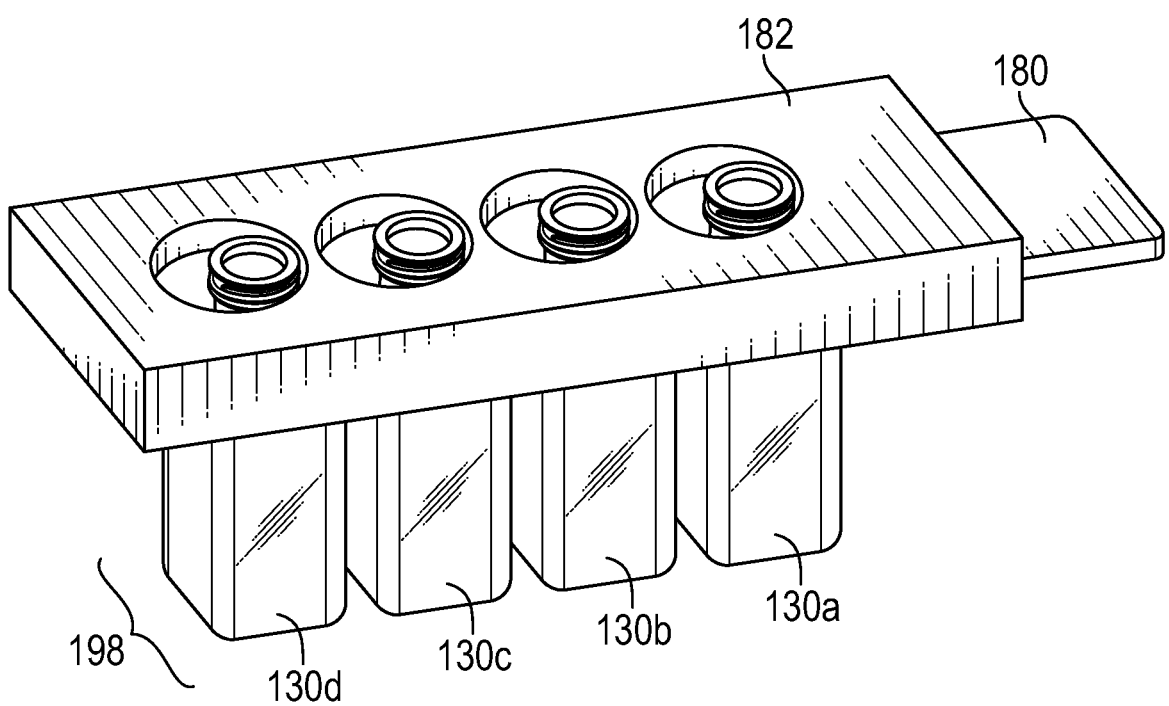
FIG. 18 is a side perspective view of the transport assembly of FIG. 17 engaged with a plurality of glass products in a manner such as to be ready for transport.

Referring now to FIG. 18, the transport assembly 184 is illustrated in a second orientation. In the second orientation, the plurality of glass products 130*a*-130*d* have been engaged by the second apertures of the slotted element assembly 180, thereby securing the glass products 130*a*-130*d* to the transport assembly 184. In this orientation, the plurality of glass products 130*a*-130*d* are secured for transport. Since the lateral movement of the slotted element assembly 180 within the carriage assembly 182 has captured the plurality of glass products 130*a*-130*d* within the second apertures of the slotted element assembly 180, a loss of power to an actuator (not shown) does not release the grip of the second apertures on the necks of the glass products 130*a*-130*d*. Accordingly and advantageously, the transport assembly 184 continues to grip and secure the glass products 130*a*-130*d* in the event of a loss of power to the actuator.

While the embodiment of the transport assembly 184 shown in FIGS. 17 and 18 illustrate a single column 198 of glass products 130*a*-130*d* having a certain size and shape, it should be appreciated that in other embodiments, the transport assembly 184 can be configured for securing and transporting more than a single column of glass products and glass products having other sizes and shapes.

The principle and mode of operation of the glass product transport apparatus and method of use have been described in certain embodiments. However, it should be noted that the glass product transport apparatus and method of use may be practiced otherwise than as specifically illustrated and described without departing from its scope.

What is claimed is:

1. A method of using a glass product transport apparatus comprising the steps of:
   engaging a narrowed portion of a glass product with a slotted element assembly;
   receiving the slotted element assembly within a longitudinal slot of a carriage assembly, wherein the carriage assembly is formed from a plurality of support carriages connected together in an end-to-end arrangement, the longitudinal slot configured to facilitate longitudinal movement of the slotted element assembly;
   moving the slotted element assembly in a longitudinal direction with an actuator; and
   supporting the carriage assembly with a rail structure in a hanging arrangement with one or more tabs, wherein the one or more tabs have a t-shaped cross-sectional shape;
   wherein the slotted element assembly is configured to retain the glass product in the event power is removed from the actuator.

2. The method of claim 1, wherein the narrowed portion is a neck of a bottle.

3. The method of claim 1, including the step of forming a first and second aperture in the slotted element assembly, and wherein the first aperture has a diameter that is larger than a diameter of the second aperture.

4. The method of claim 3, including the step of connecting the first and second apertures in a manner such as to form a keyhole opening.

5. The method of claim 1, including the step of forming the slotted element assembly from a plurality of slotted elements connected together in an end-to-end arrangement.

6. A method of using a glass product transport apparatus comprising the steps of:
   engaging a narrowed portion of a glass product with a slotted element assembly and including the step of forming the slotted element assembly as a unitary body, and wherein the slotted element assembly includes more than one keyhole opening;
   receiving the slotted element assembly within a longitudinal slot of a carriage assembly, the longitudinal slot configured to facilitate longitudinal movement of the slotted element assembly;
   moving the slotted element assembly in a longitudinal direction with an actuator; and
   supporting the carriage assembly with a rail structure;
   wherein the slotted element assembly is configured to retain the glass product in the event power is removed from the actuator.

7. A method of using a glass product transport apparatus comprising the steps of:
   engaging a narrowed portion of a glass product with a slotted element assembly;
   receiving the slotted element assembly within a longitudinal slot of a carriage assembly, the longitudinal slot configured to facilitate longitudinal movement of the slotted element assembly and including the step of forming the carriage assembly as a unitary body, and wherein the carriage assembly includes more than one aperture;
   moving the slotted element assembly in a longitudinal direction with an actuator; and
   supporting the carriage assembly with a rail structure;
   wherein the slotted element assembly is configured to retain the glass product in the event power is removed from the actuator.

\* \* \* \* \*